United States Patent
Matsuda et al.

(10) Patent No.: US 7,776,805 B2
(45) Date of Patent: Aug. 17, 2010

(54) COPOLYMER, LUBRICATING OIL VISCOSITY MODIFIER, AND LUBRICATING OIL COMPOSITION

(75) Inventors: Akihiro Matsuda, Ichihara (JP); Nobuo Murase, Ichihara (JP); Satoshi Ikeda, Ichihara (JP); Masahiro Enna, Ichihara (JP); Junichi Mohri, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 11/976,092

(22) Filed: Oct. 19, 2007

(65) Prior Publication Data

US 2008/0125561 A1  May 29, 2008

Related U.S. Application Data

(60) Provisional application No. 60/857,786, filed on Nov. 9, 2006.

(30) Foreign Application Priority Data

Oct. 20, 2006 (JP) ............................ 2006-286850

(51) Int. Cl.
*C10M 143/04* (2006.01)
*C08F 10/02* (2006.01)

(52) U.S. Cl. ...................................... 508/591; 526/348

(58) Field of Classification Search ................ 526/348; 508/591
See application file for complete search history.

(56) References Cited

U.S. PATENT DOCUMENTS

| 3,697,429 | A | 10/1972 | Engel et al. |
| 5,177,147 | A | 1/1993 | Spenadel et al. |
| 6,110,880 | A | 8/2000 | Verstrate et al. |
| 6,589,920 | B2 | 7/2003 | Okada et al. |
| 6,921,794 | B2 * | 7/2005 | Cozewith et al. ............ 525/240 |
| 7,022,766 | B2 | 4/2006 | Okada et al. |
| 2002/0055445 | A1 * | 5/2002 | Okada et al. ................ 508/591 |
| 2005/0049373 | A1 * | 3/2005 | Minami et al. .............. 526/160 |
| 2006/0199905 | A1 * | 9/2006 | Hughes et al. .............. 525/191 |

FOREIGN PATENT DOCUMENTS

| JP | 60-35009 | 2/1985 |
| JP | 6-96624 | 4/1994 |
| JP | 2002-507225 | 3/2002 |
| JP | 2003-48931 | 2/2003 |
| WO | WO 00/60032 | 10/2000 |
| WO | WO 01/85880 A1 | 11/2001 |

* cited by examiner

*Primary Examiner*—Milton I Cano
*Assistant Examiner*—Brieann R Fink
(74) *Attorney, Agent, or Firm*—Foley & Lardner LLP

(57) ABSTRACT

A copolymer containing a constituent unit derived from ethylene and a constituent unit derived from an α-olefin having 3 to 20 carbon atoms and satisfying the following requirements (1) to (5): (1) the copolymer has a melting point (Tm) of −20° C. to 100° C.; (2) the melting point (Tm) and the density D (g/cm$^3$) satisfy the following expression Tm≧1073×D−893 (1); (3) the copolymer has a molecular weight distribution (Mw/Mn) measured by GPC of 1.6 to 5.0; (4) the copolymer has a half-width (ΔThalf) of a melting peak measured by DSC of 90° C. or less; and (5) the half-width (ΔThalf) and the melting point (Tm) satisfy the relationship shown by the following expression ΔThalf≦−0.71×Tm+101.4           (2).

7 Claims, No Drawings

COPOLYMER, LUBRICATING OIL VISCOSITY MODIFIER, AND LUBRICATING OIL COMPOSITION

BACKGROUND OF THE INVENTION

1. Field of the Invention

The present invention relates to a novel copolymer and use thereof. More particularly, the present invention relates to a copolymer including a constituent unit derived from ethylene and a constituent unit derived from an α-olefin and having specific properties, a lubricating oil viscosity modifier including the copolymer, and a lubricating oil composition including the lubricating oil viscosity modifier.

2. Description of Related Art

Petroleum products generally have so-called "a temperature dependence of viscosity", i.e., the viscosity increases as the temperature decreases, and decreases as the temperature increases. For example, it is preferred that a lubricating oil used for automobiles and the like have a small temperature dependence of viscosity. Therefore, a specific polymer soluble in a lubricating oil base stock is used for a lubricating oil as a viscosity modifier in order to reduce the temperature dependence of viscosity. In recent years, an ethylene/α-olefin copolymer has been widely used as such a viscosity modifier. In order to provide a lubricating oil with a further improved performance balance, various improvements have been made on the viscosity modifier.

A viscosity modifier as described above is generally used to suppress a decrease in viscosity of a lubricating oil at a high temperature. In recent years, a viscosity modifier has been demanded which also suppresses an increase in viscosity of a lubricating oil at a low temperature (i.e., excellent low-temperature properties). A lubricating oil composition is used in applications in which a shear stress is applied. Therefore, a lubricating oil composition is required to exhibit excellent shear stability. A polymer having a low molecular weight is generally used to improve shear stability. On the other hand, it is necessary to increase the amount of viscosity modifier added along with a decrease in molecular weight in order to obtain viscosity required as a lubricating oil, whereby economic efficiency deteriorates. Moreover, there is a problem that reducing the amount of viscosity modifier added deteriorates shear stability by using a viscosity modifier having a high molecular weight to improve the economic efficiency of a lubricating oil.

Various catalysts have been studied in order to narrow the molecular weight distribution of a polymer, and a catalyst supported on highly active magnesium chloride, a metallocene catalyst, a vanadium catalyst and the like have been proposed. A polymer produced using such a catalyst having an Mw/Mn of 1.2 is known (see JP-A-S60-35009, for example).

It is known that appropriate low-temperature properties are obtained when using a blend of ethylene/α-olefin copolymers differing in the amount of constituent unit derived from ethylene as a viscosity modifier for a lubricating oil. However, the resulting lubricating oil exhibits an insufficient performance balance (see U.S. Pat. No. 3,697,429, for example). Another innovation has been adopted utilizing the properties of living polymerization. For example, a random copolymer and a block copolymer of ethylene and an α-olefin, which have a narrow molecular weight distribution and a narrow composition distribution and the composition of which changes in the molecule, have been disclosed. These copolymers have excellent shear stability, thickening properties, and low-temperature properties particularly suitable for lubricating oil applications, and are known to be suitable as a lubricating oil viscosity index improver. In particular, it is preferable to use a block copolymer having segments with different compositions in one molecule (see JP-A-S60-35009, for example). Use of a tubular reactor has been disclosed as a method of continuously obtaining a polymer having a narrow molecular weight distribution using a living polymerization catalyst. When producing a copolymer using a tubular reactor, the monomer composition in the reactor changes with the passage of time since the monomers differ in reactivity, whereby a tapered copolymer is obtained which has a wide intramolecular composition distribution in which the composition changes stepwise in the polymer chain. The polymer disclosed in the JP-A-60-35009 is suitable as a viscosity index improver for a lubricating oil. However, an improvement in low-temperature properties is insufficient when using the polymer disclosed in the JP-A-60-35009 having a narrow molecular weight distribution with an Mw/Mn of about 1.2, and further improvement is required. As a method of improving low-temperature properties, a method is known which increases the amount of constituent units derived from ethylene in the polymer while avoiding a range in which the low-temperature properties deteriorate to a large extent. However, since the intramolecular composition distribution of a tapered copolymer is wide, it is difficult to avoid the range.

A lubricating oil viscosity modifier formed of an olefin block copolymer has been proposed (see JP-T-2002-507225, for example). One of the blocks of the olefin block copolymer disclosed in the JP-T-2002-507225 contains about 93 wt % of constituent units derived from ethylene, whereby the olefin block copolymer exhibits an insufficient improvement effect of low-temperature property.

As another olefin block copolymer used for a lubricating oil viscosity modifier, an olefin block copolymer is known which contains an ethylene/α-olefin polymer block containing a large amount of constituent units derived from ethylene and an ethylene/α-olefin polymer block containing a large amount of constituent units derived from an α-olefin (see JP-A-2003-48931, for example).

Lubricating oil viscosity modifiers having other configurations are also known (see WO00/60032, JP-A-2003-48931, and JP-B-6-96624, for example).

However, a lubricating oil composition using the related-art lubricating oil viscosity modifier must be improved in terms of low-temperature fluidity.

SUMMARY OF THE INVENTION

The present invention has been achieved in order to solve the above-mentioned problems of the related art. An object of the present invention is to provide a lubricating oil composition exhibiting excellent low-temperature properties, a lubricating oil viscosity modifier included in the lubricating oil composition, and a specific copolymer including a constituent unit derived from ethylene and a constituent unit derived from an α-olefin having 3 to 20 carbon atoms and included in the lubricating oil viscosity modifier.

The inventors of the present invention have conducted extensive studies in order to achieve the above object. As a result, the inventors have found that a lubricating oil composition including a lubricating oil viscosity modifier including the following specific copolymer exhibits excellent low-temperature properties. This finding has led to completion of the present invention.

Specifically, a copolymer according to the present invention has a constituent unit derived from ethylene and a constituent unit derived from an α-olefin having 3 to 20 carbon atoms and satisfies the following requirements (1) to (6):

(1) the copolymer has a melting point (Tm) measured by DSC of −20° C. to 100° C.;

(2) the copolymer has a molecular weight distribution (Mw/Mn) measured by GPC of 1.6 to 5.0:

(3) the copolymer has a half-width (ΔThalf) of a melting peak measured by DSC of 90° C. or less;

(4) the half-width (ΔThalf) and the melting point (Tm) satisfy the relationship shown by the following expression (2), $$\Delta Thalf \leq -0.71 \times Tm + 101.4 \qquad (2);$$

(5) the copolymer has a heat of melting (ΔH) measured by DSC of 100 J/g or less; and (6) the heat of melting (ΔH), the crystallization temperature Tc measured by DSC, and the crystallization temperature Tcrystaf measured by a CRYSTAF method satisfy the following relational expression (3), $$Tc-Tcrystaf \geq 0.028 \times \Delta H + 25.3 \qquad (3).$$

In the copolymer, it is preferable that the α-olefin be propylene.

It is preferable that the copolymer has a weight average molecular weight relative to polystyrene standards measured by GPC of 10,000 to 2,000,000.

The present invention includes a lubricating oil viscosity modifier containing the copolymer.

The present invention also includes a lubricating oil composition containing the lubricating oil viscosity modifier.

The lubricating oil composition containing the lubricating oil viscosity modifier containing the copolymer according to the present invention exhibits excellent low-temperature properties.

DETAILED DESCRIPTION OF THE INVENTION AND PREFERRED EMBODIMENTS

The copolymer, the lubricating oil viscosity modifier, and the lubricating oil composition according to the present invention are described below in detail.

(Copolymer)

The copolymer according to the present invention comprises a constituent unit derived from ethylene and a constituent unit derived from an α-olefin having 3 to 20 carbon atoms and satisfies the following requirements (1) to (6):

(1) the copolymer has a melting point (Tm) measured by DSC of −20° C. to 100° C.;

(2) the copolymer has a molecular weight distribution (Mw/Mn) measured by GPC of 1.6 to 5.0;

(3) the copolymer has a half-width (ΔThalf) of a melting peak measured by DSC of 90° C. or less;

(4) the half-width (ΔThalf) and the melting point (Tm) satisfy the relationship shown by the following expression (2), $$\Delta Thalf \leq -0.71 \times Tm + 101.4 \qquad (2);$$

(5) the copolymer has a heat of melting (ΔH) measured by DSC of 100 J/g or less; and (6) the heat of melting (ΔH), the crystallization temperature Tc measured by DSC, and the crystallization temperature Tcrystaf measured by a CRYSTAF method satisfy the following relational expression (3), $$Tc-Tcrystaf \geq 0.028 \times \Delta H + 25.3 \qquad (3).$$

The copolymer according to the present invention is not particularly limited insofar as the copolymer comprises a constituent unit derived from ethylene and a constituent unit derived from an α-olefin having 3 to 20 carbon atoms and satisfies the requirements (1) to (6).

Examples of the α-olefin having 3 to 20 carbon atoms include linear or branched α-olefins having 3 to 20 carbon atoms such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclic α-olefins having 3 to 20 carbon atoms such as cyclopentene, cycloheptene, norbornene, alkylnorbornene such as 5-methyl-2-norbornene, tetracyclododecene and 2-methyl-1,4,5,8-dimethano-1,2,3,4,4a,5,8,8a-octahydronaphthalene.

These α-olefins may be used either individually or in combination of two or more.

Of these α-olefins, propylene, 1-butene, 1-pentene, 1-hexene, 1-heptene and 1-octene are preferred in terms of low-temperature viscosity, with propylene being most preferred.

The copolymer according to the present invention has an average molecular weight (Mw) relative to polystyrene standards measured by GPC (gel permeation chromatography) of 10,000 or more, preferably 20,000 or more, more preferably 40,000 or more, and still more preferably 60,000 or more. It is normally 2,000,000 or less, preferably 1,000,000 or less, and particularly preferably 500,000 or less, although the upper limit is not particularly limited.

The copolymer according to the present invention satisfies the requirements (1) to (6). The requirements (1) to (6) are described below in detail.

<Requirement (1)>

The copolymer according to the present invention has a melting point (Tm) of in the range of −20° C. to 100° C.

The melting point (Tm) used in the present invention refers to the melting point of the copolymer measured using a differential scanning calorimeter (DSC). The melting point (Tm) of the copolymer according to the present invention is preferably in the range of −10° C. to 80° C., and particularly preferably 0° C. to 60° C. If the melting point (Tm) is within this range, the lubricating oil composition exhibits excellent low-temperature properties (balance between the low-temperature viscosity and low-temperature fluidity).

<Requirement (2)>

The copolymer according to the present invention has a molecular weight distribution (Mw/Mn) measured by GPC of 1.6 to 5.0.

In the present invention, the molecular weight distribution is measured using monodispersed polystyrene as a standard substance. The copolymer according to the present invention preferably has a molecular weight distribution (Mw/Mn) of 1.6 to 4.5, and more preferably 1.6 to 4.0. If the molecular weight distribution (Mw/Mn) is within this range, the lubricating oil composition exhibits excellent low-temperature properties (balance between the low-temperature viscosity and low-temperature fluidity).

<Requirement (3)>

The copolymer according to the present invention has a half-width (ΔThalf) of a melting peak measured by DSC of 90° C. or less.

The half-width of a melting peak used in the present invention refers to the half-width of the melting peak measured using a differential scanning calorimeter (DSC).

The ΔThalf of the copolymer according to the present invention is preferably 80° C. or less, and particularly preferably 75° C. or less. If the ΔThalf is within this range, the lubricating oil composition exhibits excellent low-temperature properties (balance between the low-temperature viscosity and low-temperature fluidity).

<Requirement (4)>

The copolymer according to the present invention satisfies the relationship shown by the following expression (2) in terms of the half-width (ΔThalf) of the melting peak and the Tm.

$$\Delta Thalf \leq -0.71 \times Tm + 101.4 \quad (2)$$

The copolymer according to the present invention satisfies the relationship shown by the expression (2) in terms of the ΔThalf and the Tm.

If the expression (2) is satisfied, the lubricating oil composition exhibits excellent low-temperature properties (balance between the low-temperature viscosity and low-temperature fluidity).

<Requirement (5)>

The copolymer according to the present invention has a heat of melting (ΔH) measured by DSC of 100 J/g or less, preferably 90 J/g or less, and more preferably 80 J/g or less. The lower limit of the heat of melting is 1 J/g, although the lower limit is not particularly limited.

If the ΔH is within this range, the low-temperature properties (low-temperature fluidity) are improved.

<Requirement (6)>

The copolymer according to the present invention satisfies the following relational expression (3) in terms of the ΔH, the crystallization temperature, Tc, measured by DSC, and a crystallization temperature, Tcrystaf, measured by a CRYSTAF method. The copolymer more preferably satisfies the expression (3'), still more preferably satisfies the expression (3''), and particularly preferably satisfies the expression (3''').

$$Tc - Tcrystaf \geq 0.028 \times \Delta H + 25.3 \quad (3)$$

$$Tc - Tcrystaf \geq 0.028 \times \Delta H + 26.3 \quad (3')$$

$$Tc - Tcrystaf \geq 0.28 \times \Delta H + 28.3 \quad (3'')$$

$$Tc - Tcrystaf \geq 0.028 \times \Delta H + 30.3 \quad (3''')$$

When using a copolymer satisfying the above relational expression, the low-temperature properties (balance between the low-temperature viscosity and low-temperature fluidity) are improved.

It is preferable that the copolymer according to the present invention further satisfies the following requirement (α).

<Requirement (α)>

It is preferable that the copolymer according to the present invention satisfies the following expression (3) in terms of the heat of melting (ΔH) measured by DSC and the Tm.

$$\Delta H \leq 0.67 \times Tm + 38.3 \quad (3)$$

If the expression (3) is satisfied, the lubricating oil composition exhibits excellent low-temperature properties (balance between the low-temperature viscosity and low-temperature fluidity).

<Requirement (β)>

It is preferable that the copolymer according to the present invention satisfies the relationship shown by the following expression (1) in terms of the Tm and the density D (g/cm³).

$$Tm \geq 1073 \times D - 893 \quad (1)$$

The copolymer according to the present invention preferably satisfies the relationship shown by the expression (1) in terms of the Tm and the density.

The density D of the copolymer according to the present invention is not particularly limited. The density D of the copolymer according to the present invention is normally 0.850 g/cm³ to 0.930 g/cm³.

If the expression (1) is satisfied, the lubricating oil composition exhibits excellent low-temperature properties (balance between the low-temperature viscosity and low-temperature fluidity).

It suffices that the copolymer according to the present invention comprise a constituent unit derived from ethylene and a constituent unit derived from an α-olefin having 3 to 20 carbon atoms and satisfy the requirements (1) to (6). The copolymer according to the present invention may comprise structural units derived from other monomers insofar as the object of the present invention is not impaired.

The manner of copolymerization of the copolymer according to the present invention is not particularly limited. The copolymer according to the present invention is normally a block copolymer.

As a specific embodiment of the copolymer according to the present invention, a copolymer can be given which comprises a polymer block (i) which is obtained from ethylene and an α-olefin having 3 to 20 carbon atoms and has a molar ratio of a constituent unit derived from ethylene and a constituent unit derived from the α-olefin (ethylene/α-olefin) of 20/80 to 65/35 and a weight average molecular weight of 5,000 to 1,000,000, and a polymer block (ii) which is obtained from ethylene and an α-olefin having 3 to 20 carbon atoms and has a molar ratio of a constituent unit derived from ethylene and a constituent unit derived from the α-olefin (ethylene/α-olefin) of 70/30 to 85/15 and a weight average molecular weight of 5,000 to 800,000, wherein each end of the copolymer is the polymer block (i).

It is preferable that the polymer block (i) be obtained from ethylene and an α-olefin having 3 to 20 carbon atoms and has a molar ratio of a constituent unit derived from ethylene and a constituent unit derived from the α-olefin (ethylene/α-olefin) of 20/80 to 65/35, and preferably 40/60 to 64/36 and a weight average molecular weight of 5,000 to 1,000,000, preferably 20,000 to 1,000,000, more preferably 20,000 to 800,000, and still more preferably 20,000 to 500,000.

It is preferable that the polymer block (ii) be obtained from ethylene and an α-olefin having 3 to 20 carbon atoms and has a molar ratio of a constituent unit derived from ethylene and a constituent unit derived from the α-olefin (ethylene/α-olefin) of 70/30 to 85/15, and preferably 73/27 to 82/18 and a weight average molecular weight of 5000 to 800,000, preferably 20,000 to 800,000, more preferably 40,000 to 600,000, and still more preferably 40,000 to 500,000.

The polymer block (i) is normally low-crystalline or amorphous due to a low ethylene content, and the polymer block (ii) is normally crystalline due to a high ethylene content.

If the ethylene/α-olefin molar ratios and the weight average molecular weights of the polymer blocks (i) and (ii) are within the above ranges, a lubricating oil viscosity modifier is obtained which produces a lubricating oil composition exhibiting excellent low-temperature properties. The molar ratio of a constituent unit derived from ethylene and a constituent unit derived from the α-olefin may be adjusted to the above range by adjusting the ratio of the raw material monomers. The weight average molecular weight may be adjusted to the above range by controlling the polymerization temperature, the polymerization time and the like during polymerization.

As examples of a preferred form of the copolymer according to the present invention, (i)-(ii)-(i), (i)-(ii)-(i)-(ii)-(i) and the like can be given. The copolymer according to the present invention normally shown by (i)-[(ii)-(i)]$_n$ (wherein n is an integer of 1 or more, and preferably 1 to 3).

When the copolymer according to the present invention has the above specific form, the copolymer according to the present invention may further comprise a polymer block (iii) other than the polymer blocks (i) and (ii). The polymer block (iii) may be a block of a homopolymer of an olefin selected from ethylene and α-olefins having 3 to 20 carbon atoms or a block of a random copolymer of two or more olefins selected from α-olefins having 3 to 20 carbon atoms. It suffices that the copolymer according to the present invention comprise a constituent unit derived from ethylene and a constituent unit derived from an α-olefin having 3 to 20 carbon atoms and satisfy the requirements (1) to (6). The copolymer according to the present invention may comprise structural units derived from other monomers insofar as the object of the present invention is not impaired.

In the present invention, Tm, the requirement (1), may be adjusted by increasing or decreasing the amount of ethylene monomer. Tm generally increases as the amount of ethylene monomer increases, and Tm decreases as the amount of ethylene monomer decreases.

In the copolymer according to the present invention, Mw/Mn, the requirement (2), may be adjusted by increasing or decreasing the polymerization temperature.

In the copolymer according to the present invention, ΔThalf, the requirement (3), may be increased or decreased by increasing or decreasing the catalyst concentration at the initiation of polymerization. Specifically, the ΔThalf may be increased by increasing the catalyst concentration at the initiation of polymerization. The ΔThalf may also be increased under conditions whereby a polymerization reaction rapidly occurs.

The copolymer according to the present invention satisfies the following expression (2) in terms of the ΔThalf and the Tm (requirement (4)).

$$\Delta \text{Thalf} \leq -0.7 \times \text{Tm} + 101.4 \quad (2)$$

According to the present invention, the copolymer satisfying the requirement (4) may be produced by adjusting the ΔThalf and the Tm using the above-described methods, for example.

Regarding the ΔH, the requirement (5), ΔH may be increased or decreased by increasing or decreasing the amount of ethylene monomer during the production of either segment of the copolymer according to the present invention, for example.

In the copolymer according to the present invention, for example, Tc-Tcrystaf may be increased or decreased by increasing or decreasing the polymerization time during the production of either segment of the copolymer (i.e., increasing or decreasing the ratio of the segments), whereby a copolymer satisfying the requirement (6) may be produced.

The copolymer satisfying the preferred requirement (α) may be produced, for example, by incorporating an amorphous polymer block in the polymer chain.

A copolymer satisfying the preferred requirement (β), may be produced, for example, by incorporating a crystalline polymer block in the polymer chain.

(Copolymer Production Method)

The copolymer used as the lubricating oil viscosity modifier according to the present invention may be obtained by copolymerizing ethylene and at least one olefin selected from α-olefins having 3 to 20 carbon atoms as described below in the presence of an olefin polymerization catalyst including the transition metal compound (A), and preferably an olefin polymerization catalyst including the transition metal compound (A) and at least one compound (B) selected from the organometallic compound (B-1), the organoaluminumoxy compound (B-2), and the compound which reacts with the transition metal compound (A) to form an ion pair (B-3).

(Transition Metal Compound (A))

The transition metal compound used in the production of the copolymer is a transition metal compound represented by the following general formula (I), for example. In the β-agostic structure of the transition metal compound determined by a density functional theory for a cationic complex in which one of the Xs in the general formula (I) is replaced with an n-propyl group, it is preferable that the distance between the nearest heteroatom which is not directly bonded to the center metal M and the hydrogen at the β-position be 3.0 angstroms or less and the electrostatic energy be −10 kJ/mol or less.

The term "density functional theory" refers to calculations by a BLYP method using a program ADF2000.01 (developed by SCM (Netherlands); obtained by making a license agreement with SCM and downloading the program from the SCM website (html://www.scm.com)). The basis function is a Slater-type function. A triple-zeta function is used for the center metal and a double-zeta function is used for other atoms when determining the structure. When evaluating the electrostatic energy, a polarization function is added to the double-zeta function for other atoms. This basis function is also used in point calculations for an optimum structure obtained by the structural calculations. The Pauli's relativistic potential is corrected in calculations other than the structural calculations. The term "electrostatic energy" refers to the electrostatic energy between the hydrogen at the β-position and the nearest heteroatom. More specifically, the term "electrostatic energy" refers to an interatomic electrostatic interaction based on the electronic state determined by assigning the charge obtained by complex calculations to these two atoms. The term "charge" used herein refers to the electron population of the s, p, and d orbitals of these two atoms obtained by complex calculations (point calculations for the optimum β-agostic structure obtained by the structural calculations).

$$L_mMX_n \quad (I)$$

wherein M represents a transition metal atom selected from the groups 3 to 11 of the periodic table. The term "m" represents an integer from 1 to 5. The term "n" represents a number satisfying the valence of M. L represents a ligand coordinated to the center metal M and having a heteroatom which is not directly bonded to the center metal M.

X represents an oxygen atom, a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and the groups represented by X may be same or different from each other and may be bonded each other to form a ring when n is two or more.

The copolymer may be produced in the presence of an olefin polymerization catalyst including a transition metal compound of the following general formula (II-a) or (II-b).

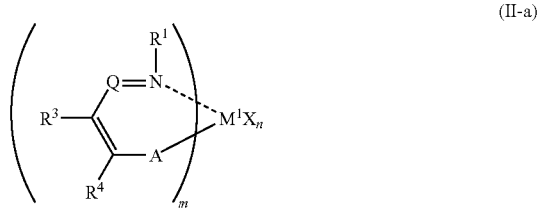

(II-a)

wherein $M^1$ represents a transition metal atom selected from the groups 3 to 11 of the periodic table. The term "m" represents an integer from 1 to 5. Q represents a nitrogen atom or a carbon atom having a substituent $R^2$. The term "A" represents an oxygen atom, a sulfur atom, a selenium atom, or a nitrogen atom having a substituent $R^5$.

$R^2$ represents a hydrocarbon group having one or more heteroatom(s) or a hydrocarbon group having one or more heteroatom-containing group. $R^2$ to $R^5$, which may be same or different from each other, individually represent a hydrogen atom, a halogen atom, a hydrocarbon group, a hydrocarbon-substituted silyl group, an oxygen-containing group, a nitrogen-containing group, a sulfur-containing group, a boron-containing group, an aluminum-containing group, a phosphorus-containing group, a halogen-containing group, a heterocyclic compound residue, a silicon-containing group, a germanium-containing group or a tin-containing group, and two or more of the groups may be bonded to form a ring. When m is two or more, $R^1$, $R^2$, $R^3$, $R^4$, and $R^5$ may be same or different from each other, and one group among groups of $R^2$ to $R^5$ included in one ligand may be bonded to one group among groups of $R^2$ to $R^5$ included in another ligand.

The term "n" is a number satisfying the valence of M. X represents the same atom or group as X in the formula (I), and the groups represented by X may be same or different from each other and may be bonded to form a ring when n is two or more.

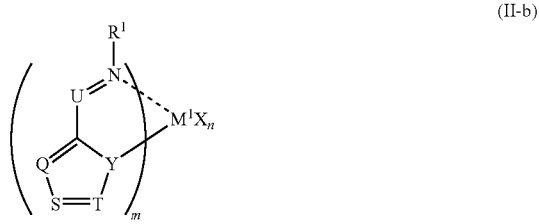

(II-b)

wherein $M^1$ represents a transition metal atom selected from the groups 3 to 11 of the periodic table. The term "m" represents an integer from 1 to 5. Y represents a nitrogen atom or a phosphorus atom. U represents a carbon atom having a substituent $R^6$, a nitrogen atom, or a phosphorus atom. Q represents a carbon atom having a substituent $R^7$, a nitrogen atom, or a phosphorus atom.

S represents a carbon atom having a substituent $R^8$, a nitrogen atom, or a phosphorus atom. T represents a carbon atom having a substituent $R^9$, a nitrogen atom, or a phosphorus atom. $R^1$ represents a hydrocarbon group having one or more heteroatom(s) or a hydrocarbon group having one or more heteroatom-containing group. $R^6$ to $R^9$, which may be same or different from each other, individually represent the same atom or group as $R^2$ to in the formula (II-a), and two or more of $R^6$ to $R^9$ may be bonded each other to form a ring. When m is two or more, $R^1$s, $R^6$s, $R^7$s, $R^8$s, and $R^9$s each may be same or different from each other, and one group among groups of $R^6$ to $R^9$ included in one ligand may be bonded to one group among groups of $R^6$ to $R^9$ included in another ligand.

Term "n" is a number satisfying the valence of $M^1$. X represents the same atom or group as X in the formula (I), and the groups represented by X may be same or different from each other and may be bonded each other to form a ring when n is two or more. The copolymer may be produced in the presence of an olefin polymerization catalyst including a transition metal compound of the following general formula (II-a') or (II-b').

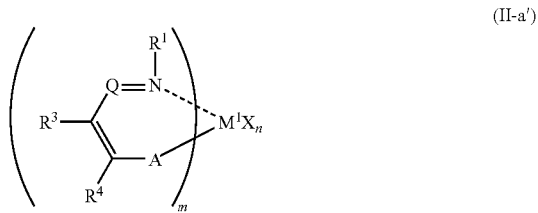

(II-a')

wherein $M^1$ represents a transition metal atom selected from the groups 3 to 11 of the periodic table. Term "m" represents an integer from 1 to 5. Q represents a nitrogen atom or a carbon atom having a substituent $R^2$. A represents an oxygen atom, a sulfur atom, a selenium atom, or a nitrogen atom having a substituent $R^5$.

$R^1$ represents a phenyl group having at least one atom or substituent selected from heteroatoms and heteroatom-containing groups, an aromatic hydrocarbon group, other than a phenyl group, having at least one atom or substituent selected from heteroatoms and heteroatom-containing groups, an aliphatic hydrocarbon group having at least one atom or substituent selected from heteroatoms and heteroatom-containing groups, or an alicyclic hydrocarbon group having at least one atom or substituent selected from heteroatoms and heteroatom-containing groups.

In the case where $R^1$ represents a phenyl group having at least one atom or substituent selected from heteroatoms and heteroatom-containing groups, and the position of the carbon atom bonded to the nitrogen atom is designated as the first position, the phenyl group has at least one atom or substituent selected from heteroatoms and heteroatom-containing groups in at least one of the second and sixth positions, or has at least one substituent selected from; 1) a heteroatom other than a fluorine atom; 2) a fluorine-containing group having one carbon atom and two or less fluorine atoms; 3) a fluorine-containing group having two or more carbon atoms; or 4) at least one substituent selected from heteroatom-containing groups having a heteroatom other than a fluorine atom; in the third, fourth, and fifth positions.

$R^2$ to $R^5$, which may be same or different from each other, individually represent the same atom or group as $R^2$ to $R^5$ in the formula (II-a), and two or more of $R^2$ to $R^5$ may be bonded each other to form a ring. When m is two or more, $R^1$s, $R^2$s, $R^3$s, $R^4$s, and $R^5$s each may be same or different from each other, and one group among groups of $R^2$ to $R^5$ included in one ligand may be bonded to one group among groups of $R^2$ to $R^5$ included in another ligand.

Term "n" is a number satisfying the valence of M. X represents the same atom or group as X in the formula (I), and the groups represented by X may be same or different from each other and may be bonded each other to form a ring when n is two or more.

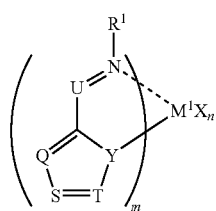

(II-b')

wherein $M^1$ represents a transition metal atom selected from the groups 3 to 11 of the periodic table. Term "m" represents an integer from 1 to 5. Y represents a nitrogen atom or a phosphorus atom. U represents a carbon atom having a substituent $R^6$, a nitrogen atom, or a phosphorus atom. Q represents a carbon atom having a substituent $R^7$, a nitrogen atom, or a phosphorus atom.

S represents a carbon atom having a substituent $R^8$, a nitrogen atom, or a phosphorus atom. T represents a carbon atom having a substituent $R^9$, a nitrogen atom, or a phosphorus atom. $R^1$ is the same as $R^1$ in the formula (II-a'). $R^6$ to $R^9$, which may be same or different from each other, individually represent the same atom or group as $R^2$ to $R^5$ in the formula (II-a), and two or more of $R^6$ to $R^9$ may be bonded each other to form a ring. When m is two or more, $R^1$s, $R^6$s, $R^7$s, $R^8$s, and $R^9$s each may be same or different from each other, and one group among groups of $R^6$ to $R^9$ included in one ligand may be bonded to one group among groups of $R^6$ to $R^9$ included in another ligand.

Term "n" is a number satisfying the valence of $M^1$. X represents the same atom or group as X in the formula (I), and the groups represented by X may be same or different from each other and may be bonded each other to form a ring when n is two or more. The copolymer may be produced in the presence of an olefin polymerization catalyst including a transition metal compound of the following general formula (III).

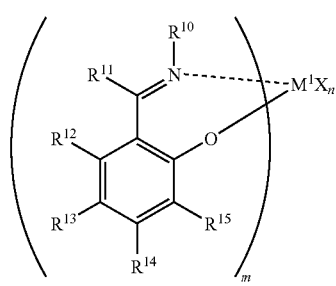

(III)

wherein $M^1$ represents a transition metal atom selected from the groups 4 and 5 of the periodic table. $R^{10}$ is the same as $R^1$ in the formula (II-a'). $R^{11}$ to $R^{14}$, which may be same or different from each other, individually represent a hydrogen atom, a halogen atom, a halogen-containing group, a hydrocarbon group, a hydrocarbon-substituted silyl group, an oxygen-containing group, a nitrogen-containing group or a sulfur-containing group.

$R^{15}$ represents a halogen atom, a halogen-containing group, a hydrocarbon group or a hydrocarbon-substituted silyl group. Term "n" is a number satisfying the valence of $M^1$. X represents the same atom or group as X in the formula (I), and the groups represented by X may be bonded each other to form a ring and the plurality of groups represented by X may be same or different from each other when n is two or more.

(Organometallic Compound (B-1))

As the organometallic compound (B-1) used as needed in the production of the copolymer, the following organometallic compounds of the groups 1, 2, and 13 of the periodic table are used.

(B-1a) Organoaluminum compounds represented by the general formula $R^a{}_mAl(OR^b)_nH_pX_q$ (wherein $R^a$ and $R^b$, which may be same or different from each other, individually represent hydrocarbon groups having 1 to 15, and preferably 1 to 4 carbon atom(s), X represents a halogen atom, m represents a number in the range of $0<m\leq3$, n represents a number in the range of $0\leq n<3$, and q represents a number in the range of $0\leq q<3$, provided that m+n+p+q=3)

(B-1b) Alkylated complex of a metal of the group 1 of the periodic table and aluminum represented by the general formula $M^2AlR^a{}_4$ (wherein $M^2$ represents Li, Na, or K, and $R^a$ represents a hydrocarbon group having 1 to 15, and preferably 1 to 4 carbon atom(s))

(B-1c) Compounds represented by the general formula $R^aR^bM^3$ (wherein $R^a$ and $R^b$, which may be same or different form each other, individually represent hydrocarbon groups having 1 to 15, and preferably 1 to 4 carbon atom(s), and $M^3$ represents Mg)

Compounds similar to the compounds (B-1a) may also be used. As examples of such compounds, organoaluminum compounds in which two or more aluminum compounds are bonded via a nitrogen atom can be given. As specific examples of such compounds, $(C_2H_5)_2AlN(C_2H_5)Al(C_2H_5)_2$ and the like can be given. As further examples, methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium may also be used.

A combination of compounds which produce the above organoaluminum compound in the polymerization system, such as a combination of aluminum halide and alkyllithium, a combination of aluminum halide and alkylmagnesium, and the like may also be used.

The organoaluminum compounds are preferred among the organometallic compounds (B-1). These organometallic compounds (B-1) are used either individually or in combination of two or more.

(Organoaluminumoxy Compound (B-2))

The organoaluminumoxy compound (B-2) used as needed in the production of the copolymer may be a known aluminoxane (also called alumoxane), or a benzene-insoluble organoaluminumoxy compound as disclosed in JP-A-2-78687.

(Compound (B-3) which Reacts with the Transition Metal Compound (A) to Form Ion Pair)

Examples of the compound (B-3) which reacts with the transition metal compound (A) to form an ion pair and is arbitrarily used in the production of the copolymer include Lewis acids, ionic compounds, borane compounds, and carborane compounds disclosed in JP-A-1-501950, JP-A-1-502036, A, JP-A-3-179005, JP-A-3-179006, JP-A-3-207703, JP-A-3-207704, U.S. Pat. No. 5,321,106 and the like. Further examples include heteropoly compounds and isopoly compounds.

The olefin polymerization catalyst used in the present invention may further include (C) a carrier and/or (D) an organic compound given below in addition to the transition metal compound (A) and at least one compound (B) (hereinafter may be called "component (B)") selected from the organometallic compound (B-1), the organoaluminumoxy compound (B-2) and the ionic compound (B-3).

(Carrier (C))

The carrier (C) used in the present invention as needed is an inorganic or organic compound in the form of granular or particulate solids. As the inorganic compound, a porous oxide, an inorganic halide, clay, clay mineral, or ion-exchangeable layered compound is preferred.

(Organic Compound Component (D))

In the present invention, the organic compound component (D) is used in order to improve the polymerization performance and the properties of the polymer produced as needed. As examples of such an organic compound, alcohols, phenolic compounds, carboxylic acids, phosphorus compounds, sulfonates, and the like can be given.

The application method and the order of addition of each component are arbitrarily selected when polymerizing the components. For example, the following methods can be given.

(1) Method of adding only the transition metal compound (A) to a polymerization vessel (2) Method of adding the transition metal compound (A) and the component (B) to a polymerization vessel in an arbitrary order (3) Method of adding a catalyst component, in which the transition metal compound (A) is supported on the carrier (C) and the component (B) to a polymerization vessel in an arbitrary order (4) Method of adding a catalyst component, in which the component (B) is supported on the carrier (C), and the transition metal compound (A) to a polymerization vessel in an arbitrary order (5) Method of adding a catalyst component in which the transition metal compound (A) and the component (B) are supported on the carrier (C) to a polymerization vessel In the methods (2) to (5), at least two catalyst components may be contacted in advance. In the methods (4) and (5), in which the component (B) is supported on the carrier (C), the component (B), which is not supported on the carrier (C), may be added as needed in an arbitrary order. In this case, the components (B) added may be same or different from each other.

An olefin may be preliminary polymerized with the solid catalyst component in which the transition metal compound (A) is supported on the component (C) or with the solid catalyst component in which the transition metal compound (A) and the component (B) are supported on the component (C), and a catalyst component may further be supported on the prepolymerized solid catalyst component. The copolymer may be produced by synthesizing plurality of polymer blocks by performing the following steps (1), (2), and (3) in the presence of the above olefin polymerization catalyst.

In the step (1), the polymer block (i) is produced by copolymerizing ethylene and at least one olefin selected from α-olefins having 3 to 20 carbon atoms in the presence of the above olefin polymerization catalyst. As examples of the olefins having 3 to 20 carbon atoms, the same olefins as the above-mentioned olefins can be given. These olefins may be used either individually or in combination of two or more.

The polymerization temperature in the step (1) is normally in the range of −40 to +200° C., and preferably 0 to +150° C. The polymerization pressure is normally from normal pressure to 100 kg/cm$^2$ (9.68 MPa), and preferably from normal pressure to 50 kg/cm$^2$ (4.9 MPa).

In the step (2), ethylene and at least one olefin selected from α-olefins having 3 to 20 carbon atoms are copolymerized in the presence of the polymer block (i) produced in the step (1) to produce a polymer block in which the polymer block (ii) is bonded to the polymer block (i).

As examples of the olefins having 3 to 20 carbon atoms, the same olefins as the above-mentioned olefins can be given. These olefins may be used either individually or in combination of two or more. The polymerization temperature in the step (2) is normally in the range of −40 to +200° C., and preferably 0 to +150° C. The polymerization pressure is normally from normal pressure to 100 kg/cm$^2$ (9.8 MPa), and preferably from normal pressure to 50 kg/cm$^2$ (4.9 MPa).

In the step (3), ethylene and at least one olefin selected from α-olefins having 3 to 20 carbon atoms are copolymerized in the presence of the polymer block produced in the step (2) in which the polymer block (ii) is bonded to the polymer block (i) to produce a polymer block in which the polymer blocks (i) are formed on both sides of the polymer block (ii).

As examples of the olefins having 3 to 20 carbon atoms, the same olefins as the above-mentioned olefins can be given. These olefins may be used either individually or in combination of two or more. The polymerization temperature in the step (3) is normally in the range of −40 to +200° C., and preferably 0 to +150° C. The polymerization pressure is normally from normal pressure to 100 kg/cm$^2$ (9.8 MPa), and preferably from normal pressure to 50 kg/cm$^2$ (4.9 MPa).

The ratio of the constituent unit derived from ethylene to the constituent unit derived from the α-olefin having 3 to 20 carbon atoms included in each polymer block varies depending on the ratio of ethylene to the α-olefin having 3 to 20 carbon atoms used as the raw materials during production, the production scale, and the polymerization pressure and temperature. For example, when employing the production scale and the device of the Examples and using propylene as the α-olefin, the constituent unit derived from ethylene to the constituent unit derived from the α-olefin having 3 to 20 carbon atoms included in each polymer block may be adjusted by adjusting the amounts of the raw materials as follows.

For example, when employing the polymerization conditions of Comparative Example 1 (Polymerization Example 6), a polymer containing 49.7 mol % of the constituent unit derived from ethylene may be obtained by adjusting the gas flow rate so that the ethylene/propylene ratio is 6.5/93.5.

The ratio of the constituent unit derived from ethylene to the constituent unit derived from propylene can be changed by changing the ethylene/propylene ratio to 50/50 as in Comparative Example 3 (Polymerization Example 8), whereby the content of the constituent unit derived from ethylene can be increased to 80.9 mol %, although the content varies depending on the yield, for example.

As is clear from Comparative Example 2 (Polymerization Example 7) and Comparative Example 4 (Polymerization Example 9), the ethylene content can be changed by changing the propylene/nitrogen ratio of a propylene/nitrogen mixed gas supplied before supplying a mixed gas having the same ethylene/propylene ratio to the polymerization system.

The ratio of the constituent unit derived from ethylene to the constituent unit derived from the α-olefin having 3 to 20 carbon atoms included in the segments (i), (ii), and (iii) can be changed by appropriately changing the production conditions in accordance with the above tendencies.

In the present invention, the components may be polymerized by liquid-phase polymerization, e.g. solution polymerization or suspension polymerization, or gas-phase polymerization. Specific examples of an inert hydrocarbon medium used for liquid-phase polymerization include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; a mixture of these compounds. An olefin itself may be used as the solvent.

When polymerizing ethylene and an α-olefin having 3 to 20 carbon atoms in the presence of the above olefin polymerization catalyst, the transition metal compound (A) is normally used in an amount that would become $10^{-12}$ to 1 mol, and preferably $10^{-10}$ to $10^{-2}$ mol per liter of the reaction capacity. When the component (b-1) is used, the component (B-1) is used in an amount so that the molar ratio ((B-1)/M) of the component (B-1) to the transition metal atom (M) of the transition metal compound (A) would become normally 0.01 to 100,000, and preferably 0.05 to 50,000. When the component (B-2) is used, the component (B-2) is used in an amount so that the molar ratio ((B-2)/M) of the aluminum atom of the component (B-2) to the transition metal atom (M) of the transition metal compound (A) would become normally 10 to 500,000, and preferably 20 to 100,000. When the component (B-3) is used, the component (B-3) is used in an amount so that the molar ratio ((B-3)/M) of the component (B-3) to the transition metal atom (M) of the transition metal compound (A) would become normally 1 to 10, and preferably 1 to 5.

When the component (D) is used and the component (B) is the component (B-1), the component (D) is used in an amount so that the molar ratio ((D)/(B-1)) would become normally 0.01 to 10, and preferably 0.1 to 5. When the component (D) is used and the component (B) is the component (B-2), the component (D) is used in an amount so that the molar ratio ((D)/(B-2)) would become normally 0.001 to 2, and preferably 0.005 to 1. When the component (D) is used and the component (B) is the component (B-3), the component (D) is used in an amount so that the molar ratio ((D)/(B-3)) would become normally 0.01 to 10, and preferably 0.1 to 5.

The molecular weight of the resulting copolymer may be adjusted by controlling the monomer/catalyst ratio and the polymerization time. The above-described copolymer is suitably used as a lubricating oil viscosity modifier.

(Lubricating Oil Composition)

The lubricating oil composition according to the present invention comprises a lubricating oil viscosity modifier, which is the above-described copolymer, a lubricating oil base stock, and pour-point depressant as needed.

Each component of the lubricating oil composition according to the present invention is described below.

(Lubricating Oil Base Stock)

Examples of the lubricating oil base stock used in the present invention include mineral oil; poly-α-olefins; diesters such as polyol ester, dioctyl phthalate and dioctyl sebacate; and synthetic oils such as polyalkylene glycol. Of these, mineral oil or a blend of mineral oil and synthetic oil is preferably used.

Mineral oils are generally used after purification processes such as dewaxing etc., and are classified into several grades depending on the purification method. A mineral oil having a wax content of 0.5 to 10% is generally used. For example, a highly purified oil, which is produced by hydrocracking and has a low pour point and a high viscosity index, and mainly contains isoparaffin, may be used. A mineral oil having kinematic viscosity at 40° C. of 10 to 200 cSt is generally used.

(Four-Point Depressant)

Examples of the pour-point depressant used as needed in the present invention include alkylated naphthalene, an alkyl methacrylate (co)polymer, an alkyl acrylate (co)polymer, a copolymer of alkyl fumarate and vinyl acetate, an α-olefin polymer and a copolymer of an α-olefin and styrene. Of these, an alkyl methacrylate (co)polymer or an alkyl acrylate (co) polymer is suitably used.

(Composition)

The lubricating oil composition according to the present invention contains the lubricating oil base stock, the copolymer, and an optional pour-point depressant. When the lubricating oil composition contains the lubricating oil base stock and the copolymer, it is preferable that the lubricating oil composition contains the copolymer in an amount, for example, of 1 to 30 wt %, and preferably 1 to 20 wt % (the balance is the lubricating oil base stock and additives described later).

The lubricating oil composition exhibits excellent low-temperature properties and shear stability. The lubricating oil composition may be used as it is for lubricating oil applications. The lubricating oil composition may be used for lubricating oil applications after adding a pour-point depressant and the like.

When the lubricating oil composition contains the lubricating oil base stock, the copolymer and the pour-point depressant, it is desirable that the lubricating oil composition contains the copolymer in an amount of, for example, 0.1 to 5 wt %, preferably 0.2 to 1.5 wt %, still more preferably 0.25 to 1.5 wt %, and particularly preferably 0.30 to 1.5 wt %, and contains the our-point depressant in an amount of 0.05 to 3 wt %, preferably 0.1 to 3 wt %, still more preferably 0.1 to 2 wt %, and particularly preferably 0.2 to 1.5 wt % (the balance is the lubricating oil base stock and additives described later).

If the amount of the copolymer in the lubricating oil composition is within the above range, a lubricating oil composition exhibiting an excellent viscosity improving effect and low-temperature fluidity can be obtained. The lubricating oil composition according to the present invention may comprise additives such as a detergent dispersant, an alkyl methacrylate (co)polymer, additives having a viscosity index improving effect such as hydrogenated SBR and SEBS, a rust preventive agent, an extreme pressure additive, an anti-foaming agent, an antioxidant, a metal deactivator, and an antiwear agent in addition to the lubricating oil base stock, the olefin polymer and the pour-point depressant.

(Detergent Additive)

Examples of the detergent additive optionally used in the present invention include metal sulfonates such as calcium sulfonate, magnesium sulfonate, and barium sulfonate, thiophosphnate, phenate, salicylate, succinimido, benzylamine, succinate, and the like.

Examples of the extreme pressure agent include sulfur-based extreme pressure agents such as sulfides, sulfoxides, sulfones, thiophosphinates, thiocarbonates, sulfurized oils and fats and vulcanized olefins; phosphoric acids such as phosphates, phosphites, phosphate amine salts and phosphite amines; halogenated compounds such as chlorinated hydrocarbons.

Examples of the antiwear agent include inorganic or organic molybdenum compounds such as molybdenum disulfide; organic boron compounds such as alkylmercaptyl borate, graphite, antimony sulfide, boron compound and polytetrafluoroethylene.

Examples of the antioxidant include amine compounds such as 2,6-di-tert-butyl-4-methylphenol, sulfur or phosphorus compounds such as zinc dithiophosphate. Examples of the rust preventive agent include carboxylic acids such as oxalic acid and carboxylic acid salts; sulfonates; esters; alcohols; phosphoric acid and phosphoric acid salts; benzotriazole and benzotriazole derivatives; thiazole compounds; and the like.

Examples of the anti-foaming agent include silicone compounds such as dimethylsiloxane and a silica gel dispersion, alcohol compounds and ester compounds. These additives may be normally added in an amount of 0.01 to 50 parts by weight, and preferably 0.05 to 30 parts by weight based on 100 parts by weight of the lubricating oil composition, although the amount varies depending on the desired lubricating properties.

The lubricating oil composition according to the present invention may be prepared by mixing or dissolving the copolymer, a pour-point depressant as needed and other additives in the lubricating oil base stock using a known method.

The copolymer according to the present invention may be applied as a lubricating oil viscosity modifier, which produces a lubricating oil composition exhibiting excellent low-temperature properties. A lubricating oil composition exhibiting excellent low-temperature properties is obtained using the lubricating oil viscosity modifier according to the present invention.

The lubricating oil composition according to the present invention exhibits excellent low-temperature properties.

EXAMPLES

The present invention is further described below by way of examples. Note that the present invention is not limited to the following examples.

The properties of the copolymer and the lubricating oil composition according to the present invention were measured and evaluated as follows.

(Chemical Composition of Copolymer)

The chemical composition of the copolymer was measured using an LA500 nuclear magnetic resonance (NMR) device manufactured by JEOL Ltd. The main chain methylene peak (29.73 ppm) was used as the chemical shift reference. A commercially-available NMR measurement quartz glass tube with a diameter of 10 mm was charged with 250 to 400 mg of a sample and 3 ml of a mixed liquid of orthodichlorobenzene manufactured by Wako Pure Chemical Co., Ltd. and benzene-d6 manufactured by ISOTEC (volume ratio=4:1). The mixture was heated at 120° C. and uniformly dispersed. The measurement was carried out at a pulse width of 450 and a pulse repetition time of 5.5 seconds.

(DSC Measurement of Copolymer)

The DSC measurement of the copolymer was carried out using a differential scanning calorimeter (DSC) manufactured by Seiko calibrated with indium. The copolymer was pressed at 200° C. to form a thin film. About 10 mg of the film was weighed and placed on an aluminum DSC pan. A lid was put on the pan and was crimped to be hermetically closed. The sample pan was placed in a DSC cell, and an empty aluminum pan was placed as a reference. The sample was heated to 150° C. at a temperature increase rate of about 50° C./min under a nitrogen atmosphere, and was held at 150° C. for about five minutes. The sample was then cooled to −100° C. at a temperature decrease rate of about 10° C./min and was held at −100° C. for about five minutes. The sample was then heated at a temperature increase rate of about 10° C./min until the sample was completely melted. The peak-top temperature of the enthalpy curve obtained when decreasing the temperature was defined as the crystallization temperature Tc measured by DSC. When two or more peaks were observed, the peak-top temperature that is at the longest distance from the baseline was defined as the crystallization temperature Tc. The peak-top temperature and the peak area of the enthalpy curve obtained during the second temperature increase process were respectively was defined as the melting point (Tm) and the heat of fusion (ΔH), and the half-width (ΔThalf) of the melting peak was calculated. When two or more peaks were observed, the peak-top temperature that at the longest distance from the baseline was defined as the melting point (Tm).

When two or more peaks which are not completely separated were observed (i.e., the enthalpy curve connecting the peaks does not return to the baseline), the sum of the peak areas of two or more peaks was defined as the heat of fusion (ΔN), and the half-width (ΔThalf) was calculated with respect to the height of the peak corresponding to the melting point (Tm) for the whole peaks which are not completely separated. In this case the half-width (ΔThalf) was calculated by calculating the difference between the temperature at which the curve reaches first to half of the height of the peak corresponding to the melting point (Tm) and the temperature at which the curve reaches last to half of the height of the peak corresponding to the melting point (Tm) in the DSC enthalpy curve.

When two or more peaks, which were completely separated, were observed (i.e., the enthalpy curve connecting the peaks returns to the baseline), the peak area of the peak to which the melting point (Tm) belongs was defined as the heat of fusion (ΔH) and the half-width (ΔThalf) was calculated for the peak to which the melting point (Tm) belongs. In the present invention, it is one embodiment that the peaks are not completely separated when two or more peaks are observed in the DSC curve.

(GPC Measurement of Copolymer)

The number average molecular weight (Mn) and the weight average molecular weight (Mw) were measured using a gel permeation chromatography (GPC) system manufactured by Waters calibrated using a standard substance (monodisperse polystyrene) with a known molecular weight. TSKgelGMHS6-HT and TSKgelGMH6-HTL were used as separation columns. The inner diameter and the length of the columns were each 7.5 mm and 600 mm. The column temperature was 140° C. Orthodichlorobenzene manufactured by Wako Pure Chemical Industries, Ltd. and 0.025 wt % of BHT manufactured by Takeda Chemical Industries, Ltd. were used as the mobile phase, and was transferred at 1.0 ml/min. The sample concentration was 0.1 wt %. The amount of the sample injected was 500 microliters. A differential refractometer was used as the detector. An analyzer SC8010 manufactured by Tosoh Corp. was used for peak separation. The local minimum point between the peaks was determined, and a normal line was drawn from the minimum point toward the baseline. The Mn, Mw, and Mw/Mn at each peak and the peak intensity ratio were calculated.

(Measurement of Crystallization Temperature Tcrystaf of Copolymer)

The Tcrystaf refers to the crystallization temperature measures by a CRYSTAF method. Specifically, the crystallization temperature Tcrystaf was measured using a CRYSTAF 200+ manufactured by Polymer ChAR. A sample was dissolved in orthodichlorobenzene to adjust the concentration to 0.66 mg/ml. After allowing the solution at 160° C. for one hour and at 95° C. for 45 minutes, the solution was cooled to −20° C. at a temperature decrease rate of 0.2° C./min. The concentration of the polymer, which precipitated during the measurement, was detected using an infrared detector. The continually precipitating components were detected online, and the amount of sample precipitated was plotted with respect to the temperature to measure the amount of components separated at 95° C. to −20° C. and the amount of components separated at −20° C. or less. The peak-top temperature in a temperature range form 95° C. to −20° C. of the polymer component amount curve obtained was employed as the crystallization temperature (Tcrystaf).

(Density of Copolymer)

A strand obtained after MFR measurement at a temperature of 190° C. and a load of 2.16 kg was heated at 120° C. for one hour and allowed to gradually cool to room temperature over one hour, and the density was measured using a density gradient tube method.

(Kinetic Viscosity at 100° C.)

The kinematic viscosity of the lubricating oil composition at 100° C. was measured in accordance with ASTM D445. The lubricating oil composition used in the Examples was prepared so that the kinematic viscosity (K.V.) is about 15 mm$^2$/sec.

(Cold Cranking Simulator (CCS) Viscosity)

The CCS viscosity of the lubricating oil composition was measured at −25° C. in accordance with ASTM D2602. The CCS viscosity is used to evaluate the sliding properties (start-up performance) of a crankshaft at a low temperature. The smaller the value of the CCS viscosity, the better the low-temperature properties of the lubricating oil.

(Mini Rotary (MR) Viscosity)

The MR viscosity of the lubricating oil composition was measured at −30° C. in accordance with ASTM D4684. The MR viscosity is used to evaluate pumping properties of an oil pump at a low temperature. The smaller the value MR viscosity, the better the low-temperature properties of the lubricating oil.

(Low-Temperature Fluidity (Low-Temperature Storage Stability))

After cooling the lubricating oil composition at −18° C. for one month, the fluidity of the lubricating oil composition (appearance) was observed and evaluated as follows.

Good: exhibited fluidity

Bad: gelation occurred

Polymerization Example 1

A glass autoclave (internal capacity: 1000 ml) sufficiently replaced with nitrogen was charged with 800 ml of dry toluene. After propylene was passed through the system at 100 l/h for 15 minutes, 15.0 mmol in terms of aluminum of methylaluminoxane was added while maintaining the temperature of the system at 35° C. Subsequently, after the addition of 0.15 mmol of [bis[N-(3-t-butylsalicylidene)-2,3,4,5,6-pentafluoroanilinato]titanium(IV) dichloride] and changing to a mixed gas of ethylene/propylene=6.5/93.5 l/h (i.e., ethylene=6.5 l/h, propylene=93.5 l/h), the mixture was stirred for 30 minutes. Then, after terminating the supply of ethylene, a mixed gas of propylene/nitrogen=60/40 l/h was supplied instead and was stirred for 10 minutes. Then after changing to mixed gas of ethylene/propylene=85/15 l/h and being stirred for six minutes, terminated the supply of ethylene and the mixed gas of propylene/nitrogen=60/40 l/h was supplied instead and was stirred for 10 minutes. Then, after changing to the mixed gas of ethylene/propylene=6.5/93.5 l/h and was being stirred for 30 minutes, 20 ml of methanol and 5 ml of 1.0N hydrochloric acid were then added to terminate the reaction. After stirring the mixture for 30 minutes under a nitrogen stream, the polymerization solution was deashed with using distilled water and was poured into 1.5 l of methanol to precipitate the polymer. The obtained polymer was collected and dried at 130° C. for 10 hours under reduced pressure to obtain 9.07 g of an ethylene/propylene copolymer. The properties of the resulting polymer are shown in Table 1.

Polymerization Example 2

A copolymerization reaction was carried out in the same manner as in Polymerization Example 1 except for changing the polymerization temperature to 50° C. The properties of the resulting polymer are shown in Table 1.

Polymerization Example 3

A glass autoclave (internal capacity: 1000 ml) sufficiently replaced with nitrogen was charged with 800 ml of dry toluene. After propylene was passed through the system at 100 l/h for 15 minutes, 15.0 mmol in terms of aluminum of methylaluminoxane was added while maintaining the temperature of the system at 35° C. Subsequently, after the addition of 0.15 mmol of [bis[N-(3-t-butylsalicylidene)-2,3,4,5,6-pentafluoroanilinato]titanium(IV) dichloride] and changing to a mixed gas of ethylene/propylene=6.5/93.5 l/h, the mixture was stirred for 22 minutes. Then, after terminating the supply of ethylene, a mixed gas of propylene/nitrogen=60/40 l/h was supplied instead and was stirred for 10 minutes. Then, after changing to a mixed gas of ethylene/propylene=85/15 l/h instead. Next, terminating the supply of ethylene and being stirred for eight minutes, the mixed gas of propylene/nitrogen=60/40 l/h was supplied instead and was stirred for 10 minutes. Then, after changing to the mixed gas of ethylene/propylene=6.5/93.5 l/h and was being stirred for 25 minutes, 20 ml of methanol and 5 ml of 1.0N hydrochloric acid were then added to terminate the reaction. After stirring the mixture for 30 minutes under a nitrogen stream, the polymerization solution was deashed with using distilled water and was poured into 1.5 l of methanol to precipitate the polymer. The obtained polymer was collected and dried at 130° C. for 10 hours under reduced pressure to obtain 10.81 g of an ethylene/propylene copolymer. The properties of the resulting polymer are shown in Table 1.

Polymerization Example 4

A glass autoclave (internal capacity: 1000 ml) sufficiently replaced with nitrogen was charged with 800 ml of dry toluene. After causing propylene to pass through the system at 100 l/h for 15 minutes, 15.0 mmol in terms of aluminum of methylaluminoxane was added while maintaining the temperature of the system at 35° C. Subsequently, after the addition of 0.15 mmol of [bis[N-(3-t-butylsalicylidene)-2,3,4,5,6-pentafluoroanilinato]titanium(IV) dichloride] and changing to a mixed gas of ethylene/propylene-6.5/93.5 l/h, the mixture was stirred for 42 minutes. Then, after terminating the supply of ethylene, a mixed gas of propylene/nitrogen=60/40 l/h was supplied instead and was stirred for 10 minutes. Then, after changing to a mixed gas of ethylene/propylene=85/15 l/h and being stirred for four minutes, terminated the supply of ethylene and the mixed gas of propylene/nitrogen-60/40 l/h was supplied instead and was stirred for 10 minutes. Then, after changing to a mixed gas of ethylene/propylene=6.5/93.5 l/h and was being stirred for 45 minutes, 20 ml of methanol and 5 ml of 1.0N hydrochloric acid were then added to terminate the reaction. After stirring the mixture for 30 minutes under a nitrogen stream, the polymerization solution was deashed with using distilled water and was poured into 1.5 l of methanol to precipitate the polymer. The obtained polymer was collected and dried at 130° C. for 10 hours under reduced pressure to obtain 11.39 g of an ethylene/propylene copolymer. The properties of the resulting polymer are shown in Table 1.

100 l/h for 15 minutes, 15.0 mmol in terms of aluminum of methylaluminoxane was added while maintaining the temperature of the system at 35° C. Subsequently, after the addition of 0.15 mmol of [bis[N-(3-t-butylsalicylidene)-2,3,4,5,6-pentafluoroanilinato]titanium(IV) dichloride] and changing to a mixed gas of ethylene/propylene=6.5/93.5 l/h, the mixture was stirred for 18 minutes. Then, after terminating the supply of ethylene, a mixed gas of propylene/nitrogen=60/40 l/h was supplied instead and was stirred for 10 minutes. Next, after changing to a mixed gas of ethylene/propylene=85/15 l/h and being stirred for three minutes, terminated the supply of ethylene and the mixed gas of propylene/nitrogen-60/40 l/h was supplied instead and was stirred for 10 minutes. Then, after changing to a mixed gas of ethylene/propylene=6.5/93.5 l/h and was stirred for 24 minutes. Then, terminated the supply of ethylene and the mixed gas of propylene/nitrogen=60/40 l/h was supplied instead and was stirred for 10 minutes. Next, after changing to a mixed gas of ethylene/propylene=85/15 l/h and was being stirred for 3 minutes. After terminating the supply of ethylene, a mixed gas of propylene/nitrogen=60/40 l/h was supplied instead and was stirred for 10 minutes. Then, after changing to a mixed gas of ethylene/propylene=6.5/93.5 l/h and was being stirred for 20 minutes, 20 ml of methanol and 5 ml of 1. ON hydrochloric acid were then added to terminate the reaction. Subsequently, after stirring the mixture for 30 minutes under a nitrogen stream, the polymerization solution was decalcified in distilled water and was poured into 1.5 l of methanol to precipitate the polymer. The polymer obtained was collected and dried at 130° C. for 10 hours under reduced pressure to obtain 8.91 g of an ethylene/propylene copolymer. The properties of the resulting polymer are shown in Table 1.

TABLE 1

| | | Polymerization Example 1 | Polymerization Example 2 | Polymerization Example 3 | Polymerization Example 4 | Polymerization Example 5 |
|---|---|---|---|---|---|---|
| Ethylene content | mol % | 66.6 | 66.3 | 70.1 | 60.1 | 66.2 |
| Mw (relative to PS standards) × $10^4$ | g/mol | 20.1 | 17.8 | 20.1 | 19.9 | 17.9 |
| Mw/Mn | | 1.7 | 1.8 | 1.7 | 1.7 | 1.8 |
| Density (D) | g/cm$^3$ | 0.860 | 0.859 | 0.863 | 0.857 | 0.860 |
| Melting point (Tm, DSC) | ° C. | 44.9 | 40.5 | 43.0 | 40.9 | 42.8 |
| 1073 × density − 893 | | 29.8 | 28.7 | 33.0 | 26.6 | 29.8 |
| Heat of fusion (ΔH, DSC) | J/g | 20.7 | 25.6 | 25.6 | 18.2 | 23.7 |
| $\Delta T_{half}$ | ° C. | 45.0 | 49.5 | 46.2 | 48.2 | 50.3 |
| −0.71 × melting point + 101.4 | — | 69.5 | 72.6 | 70.9 | 72.4 | 71.0 |
| Crystallization temperature (Tc, DSC) | ° C. | 25.5 | 21.9 | 25.1 | 21.8 | 23.7 |
| Crystallization temperature (Tcrystaf) | ° C. | −9.8 | −11.3 | −10.1 | −11.4 | −12.6 |
| Tc-Tcrystaf | ° C. | 35.3 | 33.2 | 35.2 | 33.2 | 36.3 |
| 0.028 × ΔH + 25.3 | — | 25.9 | 26.0 | 26.0 | 25.8 | 26.0 |

Polymerization Example 5

A glass autoclave (internal capacity: 1000 ml) sufficiently replaced with nitrogen was charged with 800 ml of dry toluene. After causing propylene to pass through the system at Polymerization Example 6

A glass autoclave (internal capacity: 1000 ml) sufficiently replaced with nitrogen was charged with 800 ml of dry toluene. After causing propylene to pass through the system at 100 l/h for 15 minutes, 15.0 mmol (in terms of aluminum) of methylaluminoxane was added while maintaining the temperature of the system at 25° C. After the addition of 0.15 mmol of [bis[N-(3-t-butylsalicylidene)-2,3,4,5,6-pentafluoroanilinato]titanium(IV) dichloride] while supplying a mixed gas of ethylene/propylene=6.5/93.5 l/h and was being stirred for 55 minutes, 20 ml of methanol and 5 ml of 1. ON hydrochloric acid were added to terminate the reaction. Continuously, after stirring the mixture for 30 minutes under a nitrogen stream, the polymerization solution was deashed with using distilled water and was poured into 1.5 l of methanol to precipitate the polymer. The polymer was collected and dried at 130° C. for 10 hours under reduced pressure to obtain 4.89 g of an ethylene/propylene copolymer. The properties of the resulting polymer are shown in Table 2.

Polymerization Example 7

A glass autoclave (internal capacity: 1000 ml) sufficiently replaced with nitrogen was charged with 800 ml of dry toluene. After causing a mixed gas of propylene/nitrogen=60/40 l/h to pass through the system for 15 minutes, 15.0 mmol (in terms of aluminum) of methylaluminoxane was added while maintaining the temperature of the system at 25° C.

After the addition of 0.15 mmol of [bis[N-(3-t-butylsalicylidene)-2,3,4,5,6-pentafluoroanilinato]titanium(IV) dichloride] and changing to a mixed gas of ethylene/propylene=85/15 l/h and then being stirred for five minutes, 20 ml of methanol and 5 ml of 1.0N hydrochloric acid were then added to terminate the reaction. After continuously stirring the mixture for 30 minutes under a nitrogen stream, the polymerization solution was deashed with using distilled water and poured into 1.5 l of methanol to precipitate the polymer. The polymer was collected and dried at dried at 130° C. for 10 hours under reduced pressure to obtain 5.11 g of an ethylene/propylene copolymer. The properties of the resulting polymer are shown in Table 2.

Polymerization Example 8

A glass autoclave (internal capacity: 1000 ml) of which the atmosphere was sufficiently replaced with nitrogen was charged with 800 ml of dry toluene. After causing propylene to pass through the system at 100 l/h for 15 minutes, 15.0 mmol (in terms of aluminum) of methylaluminoxane was added while maintaining the temperature of the system at 25° C. Subsequently, after the addition of 0.15 mmol of [bis[N-(3-t-butylsalicylidene)-2,3,4,5,6-pentafluoroanilinato]titanium(IV) dichloride] and changing to a mixed gas of ethylene/propylene=50/50 l/h and being stirred for nine minutes, 20 ml of methanol and 5 ml of 1.0N hydrochloric acid were then added to terminate the reaction. After continuously stirring the mixture for 30 minutes under a nitrogen stream, the polymerization solution was deashed with using distilled water and was poured into 1.5 l of methanol to precipitate the polymer. The polymer was collected and dried at 130° C. for 10 hours under reduced pressure to obtain 4.76 g of an ethylene/propylene copolymer. The properties of the resulting polymer are shown in Table 2.

Polymerization Example 9

A glass autoclave (internal capacity: 1000 ml) sufficiently replaced with nitrogen was charged with 800 ml of dry toluene. After causing a mixed gas of propylene/nitrogen=20/80 l/h to pass through the system for 15 minutes, 15.0 mmol (in terms of aluminum) of methylaluminoxane was added while maintaining the temperature of the system at 25° C.

Subsequently, after the addition of 0.15 mmol of [bis[N-(3-t-butylsalicylidene)-2,3,4,5,6-pentafluoroanilinato]titanium(IV) dichloride] and changing to a mixed gas of ethylene/propylene=85/15 l/h and then being stirred for 5 minutes, 20 ml of methanol and 5 ml of 1.0N hydrochloric acid were then added to terminate the reaction. After continuously stirring the mixture for 30 minutes under a nitrogen stream, the polymerization solution was deashed with using distilled water and was poured into 1.5 l of methanol to precipitate the polymer. The polymer was collected and dried at 130° C. for 10 hours under reduced pressure to obtain 5.93 g of an ethylene/propylene copolymer. The properties of the resulting polymer are shown in Table 2.

TABLE 2

| | | Polymerization Example 6 | Polymerization Example 7 | Polymerization Example 8 | Polymerization Example 9 |
|---|---|---|---|---|---|
| Ethylene content | mol % | 49.7 | 80.9 | 75.8 | 86.9 |
| Mw (relative to PS standards) × $10^4$ | g/mol | 10.8 | 8.6 | 10.9 | 8.2 |
| Mw/Mn | | 1.2 | 1.2 | 1.2 | 1.2 |
| Density (D) | g/cm$^3$ | 0.853 | 0.871 | 0.860 | 0.889 |
| Melting point (Tm, DSC) | ° C. | — | 42.7 | 30.9 | 60.4 |
| 1073 × density − 893 | | 22.3 | 41.6 | 29.8 | 60.9 |
| Heat of fusion (ΔH, DSC) | J/g | — | 68.4 | 60.6 | 79.8 |
| ΔT$_{half}$ | ° C. | — | 47.1 | 47.4 | 45.9 |
| −0.71 × melting point + 101.4 | | — | 71.1 | 79.5 | 58.5 |
| Crystallization temperature (Tc, DSC) | ° C. | — | 28.0 | 16.9 | 48.1 |
| Crystallization temperature (Tcrystaf) | ° C. | — | 1.5 | −9.1 | 20.9 |
| Tc-Tcrystaf | ° C. | — | 26.5 | 26.0 | 27.2 |
| 0.028 × ΔH + 25.3 | | — | 27.2 | 27.0 | 27.5 |

Polymerization Example 10

A polymer indicated by 38 in Example 3 of JP-B-H6-96624 was polymerized according to the method disclosed in Example 3 of JP-B-H6-96624. The properties of the resulting polymer are shown in Table 3.

Polymerization Examples 11 and 12

Polymers indicated by the polymer ID "NDG12" and "701204095" disclosed in Example 4 of JP-T-2002-507225 were polymerized according to the method disclosed in Example 4 of JP-T-2002-507225. The properties of the resulting polymer are shown in Table 3.

TABLE 3

|  |  | Polymerization Example 10 | Polymerization Example 11 | Polymerization Example 12 |
|---|---|---|---|---|
| Ethylene content | mol % | 77.0 | 78.6 | 55.5 |
| Mw (relative to PS standards) × $10^4$ | g/mol | 0.98 | 0.98 | 13.0 |
| Mw/Mn |  | 1.42 | 1.6 | 1.2 |
| Density (D) | g/cm$^3$ | 0.862 | 0.864 | 0.853 |
| Melting point (Tm, DSC) | ° C. | 120 | 115 | −22.1 |
| 1073 × density − 893 |  | — | 31.9 | 34.1 | 22.3 |
| Heat of fusion (ΔH, DSC) | J/g | 39 | 28 | — |
| $\Delta T_{half}$ | ° C. | — | — | — |
| −0.71 × melting point + 101.4 |  | — | — | — |

Polymerization Example 13

A glass autoclave (internal capacity: 1000 ml) sufficiently replaced with nitrogen was charged with 800 ml of dry toluene. After causing propylene to pass through the system at 100 l/h for 15 minutes, 15.0 mmol in terms of aluminum of methylaluminoxane was added while maintaining the temperature of the system at 25° C. Subsequently, after the addition of 0.15 mmol of [bis[N-(3-t-butylsalicylidene)-2,3,4,5,6-pentafluoroanilinato]titanium(IV) dichloride] and changing to a mixed gas of ethylene/propylene-6.5/93.5 l/h instead of propylene, the mixture was stirred for 60 minutes. After terminating the supply of ethylene, a mixed gas of propylene/nitrogen-60/40 l/h was supplied instead and was stirred for 10 minutes. Next, after changing to a mixed gas of ethylene/propylene=85/15 l/h and being stirred for six minutes, 20 ml of methanol and 5 ml of 1.0N hydrochloric acid were then added to terminate the reaction. After continuously stirring the mixture for 30 minutes under a nitrogen stream, the polymerization solution was deashed with using distilled water and was poured into 1.5 l of methanol to precipitate the polymer. The polymer was collected and dried at 130° C. for 10 hours under reduced pressure to obtain 9.37 g of an ethylene/propylene copolymer. The properties of the resulting polymer are shown in Table 4.

TABLE 4

|  |  | Polymerization Example 13 |
|---|---|---|
| Ethylene content | mol % | 63.7 |
| Mw (relative to PS standards) × $10^4$ | g/mol | 18.2 |
| Mw/Mn |  | 1.3 |
| Density (D) | g/cm$^3$ | 0.855 |
| Melting point (Tm, DSC) | ° C. | 42.3 |
| 1073 × density − 893 |  | 24.4 |
| Heat of fusion (ΔH, DSC) | J/g | 20.8 |
| $\Delta T_{half}$ | ° C. | 48.4 |
| −0.71 × melting point + 101.4 |  | 71.4 |

Example 1

A lubricating oil composition was prepared using 87.72 wt % of 120 Neutral mineral oil (trade name, manufactured by Esso) having a kinetic viscosity at 100° C. of 4.6 mm$^2$/s as a base oil, 0.78 wt % of the copolymer obtained in polymerization Example 1 as a lubricating oil viscosity modifier), 0.5 wt % of Aclube 146 (trade name, manufactured by Sanyo Chemical Industries, Ltd.) as a pour-point depressant, and 11.0 wt % of LZ20003C (trade name, manufactured by Lubrizol) as a detergent dispersant. The performance of the resulting lubricating oil composition was evaluated. The results are shown in Table 5.

Example 2

A lubricating oil composition was prepared in the same manner as in Example 1 except for using the copolymer obtained in Polymerization Example 2 as the lubricating oil viscosity modifier in the amount shown in Table 5. The performance of the resulting lubricating oil composition was evaluated. The results are shown in Table 5.

Example 3

A lubricating oil composition was prepared in the same manner as in Example 1 except for using the copolymer obtained in Polymerization Example 3 as the lubricating oil viscosity modifier in the amount shown in Table 5. The performance of the resulting lubricating oil composition was evaluated. The results are shown in Table 5.

Example 4

A lubricating oil composition was prepared in the same manner as in Example 1 except for using the copolymer obtained in Polymerization Example 4 as the lubricating oil viscosity modifier in the amount shown in Table 5. The performance of the resulting lubricating oil composition was evaluated. The results are shown in Table 5.

Example 5

A lubricating oil composition was prepared in the same manner as in Example 1 except for using the copolymer obtained in Polymerization Example 5 as the lubricating oil viscosity modifier in the amount shown in Table 5. The performance of the resulting lubricating oil composition was evaluated. The results are shown in Table 5.

TABLE 5

| Polymer | | Example 1 Polymerization Example 1 | Example 2 Polymerization Example 2 | Example 3 Polymerization Example 3 | Example 4 Polymerization Example 4 | Example 5 Polymerization Example 5 |
|---|---|---|---|---|---|---|
| Composition | | | | | | |
| Lubricating oil base stock | wt % | 87.72 | 87.66 | 87.72 | 87.70 | 87.64 |
| Detergent dispersant | wt % | 11 | 11 | 11 | 11 | 11 |
| Pour-point depressant | wt % | 0.5 | 0.5 | 0.5 | 0.5 | 0.5 |
| Polymer | wt % | 0.78 | 0.84 | 0.78 | 0.80 | 0.86 |
| Lubricating oil performance | | | | | | |
| Kinematic viscosity @ 100° C. | $mm^2/s$ | 14.89 | 14.88 | 14.90 | 14.88 | 14.89 |
| CCS viscosity @ −25° C. | mPa · s | 7040 | 7060 | 6940 | 7270 | 7050 |
| MR viscosity @ −30° C. | mPa · s | 25500 | 27800 | 24800 | 28100 | 26200 |
| Low-temperature fluidity | | Good | Good | Good | Good | Good |

Comparative Examples 1 to 4

Lubricating oil compositions were prepared in the same manner as in Example 1 except for using the copolymers obtained in Polymerization Examples 6 to 9 as the lubricating oil viscosity modifier in the amounts shown in Table 6. The performance of the resulting lubricating oil compositions was evaluated. The results are shown in Table 6.

TABLE 6

| Polymer | | Comparative Example 1 Polymerization Example 6 | Comparative Example 2 Polymerization Example 7 | Comparative Example 3 Polymerization Example 8 | Comparative Example 4 Polymerization Example 9 |
|---|---|---|---|---|---|
| Composition | | | | | |
| Lubricating oil base stock | wt % | 87.10 | 87.00 | 87.14 | 87.01 |
| Detergent dispersant | wt % | 11 | 11 | 11 | 11 |
| Pour-point depressant | wt % | 0.5 | 0.5 | 0.5 | 0.5 |
| Polymer | wt % | 1.40 | 1.50 | 1.36 | 1.49 |
| Lubricating oil performance | | | | | |
| Kinematic viscosity @ 100° C. | $mm^2/s$ | 14.88 | 14.90 | 14.95 | 14.92 |
| CCS viscosity @ −25° C. | mPa · s | 7600 | 6820 | 7190 | 6780 |
| MR viscosity @ −30° C. | mPa · s | 40200 | 22100 | Could not be measured | Could not be measured |
| Low-temperature fluidity | | Good | Bad | Good | Bad |

Comparative Examples 5 to 7

Table 7 shows the properties of a polymer obtained by blending the polymers obtained in Polymerization Examples 6 and 7 at a specific ratio. A lubricating oil composition was prepared in the same manner as in Example 1 except for using the resulting polymer as the lubricating oil viscosity modifier in the amount shown in Table 8. The performance of the resulting lubricating oil composition was evaluated. The results are shown in Table 8.

TABLE 7

| Polymer | | Comparative Example 5 | Comparative Example 6 | Comparative Example 7 |
|---|---|---|---|---|
| Polymerization Example 6 | part by weight | 50 | 70 | 30 |
| Polymerization Example 7 | part by weight | 50 | 30 | 70 |
| Ethylene content | mol % | 67.2 | 58.4 | 71.6 |
| Mw (relative to PS) × $10^4$ | g/mol | 9.4 | 9.9 | 9.3 |
| Mw/Mn | | 1.4 | 1.4 | 1.4 |
| Density (D) | g/cm$^3$ | 0.861 | 0.857 | 0.865 |
| Melting point (Tm, DSC) | °C. | 40.9 | 40.5 | 42.5 |
| 1073 × density − 893 | | — | 30.8 | 26.6 | 35.1 |
| Heat of fusion (ΔH, DSC) | J/g | 31.5 | 22.7 | 49.9 |
| ΔT half | °C. | 51.7 | 52.9 | 50.1 |
| Crystallization temperature (TC, DSC) | °C. | 24.5 | 24.9 | 25.1 |
| Tcrystaf | °C. | −0.7 | −0.7 | −0.2 |
| Tc-Tcrystaf | °C. | 25.2 | 25.6 | 25.3 |
| 0.028 × ΔH + 25.3 | | — | 26.2 | 25.9 | 26.7 |

TABLE 8

| | | Comparative Example 5 | Comparative Example 6 | Comparative Example 7 |
|---|---|---|---|---|
| Polymer | | | | |
| Polymerization Example 6 | part by weight | 50 | 70 | 30 |
| Polymerization Example 7 | part by weight | 50 | 30 | 70 |
| Composition | | | | |
| Lubricating oil base stock | wt % | 87.04 | 87.07 | 87.03 |
| Detergent dispersant | wt % | 11 | 11 | 11 |
| Pour-point depressant | wt % | 0.5 | 0.5 | 0.5 |
| Polymer | wt % | 1.46 | 1.43 | 1.47 |
| Lubricating oil performance | | | | |
| Kinematic viscosity @ 100° C. | mm$^2$/s | 14.95 | 14.98 | 14.95 |
| CCS viscosity @ −25° C. | mPa·s | 7100 | 7420 | 6960 |
| MR viscosity @ −30° C. | mPa·s | 32200 | 37300 | 28900 |
| Low-temperature fluidity | | Good | Good | Bad |

As is clear from Tables 5 and 6, the composition using a specific ethylene/α-olefin copolymer as the lubricating oil viscosity modifier exhibited excellent low-temperature properties (CCS viscosity, MR viscosity, and low-temperature fluidity) as compared with the composition using the ethylene/α-olefin random copolymer as the lubricating oil viscosity modifier.

Comparative Examples 8 to 10

Lubricating oil compositions were prepared in the same manner as in Example 1 except for using the copolymer obtained in Polymerization Examples 10 to 12 as the lubricating oil viscosity modifier in the amounts shown in Table 9. The performance of the resulting lubricating oil compositions was evaluated. The results are shown in Table 9.

TABLE 9

| | | Comparative Example 8 Polymerization Example 10 | Comparative Example 9 Polymerization Example 11 | Comparative Example 10 Polymerization Example 12 |
|---|---|---|---|---|
| Polymer | | | | |
| Composition | | | | |
| Lubricating oil base stock | wt % | 87.40 | 87.30 | 87.25 |
| Detergent dispersant | wt % | 11 | 11 | 11 |
| Pour-point depressant | wt % | 0.5 | 0.5 | 0.5 |
| Polymer | wt % | 1.12 | 1.2 | 1.25 |
| Lubricating oil performance | | | | |
| Kinematic viscosity @ 100° C. | mm$^2$/s | 14.88 | 14.92 | 14.82 |
| CCS viscosity @ −25° C. | mPa·s | 7140 | 7100 | 7580 |
| MR viscosity @ −30° C. | mPa·s | 30200 | 37100 | 41100 |
| Low-temperature fluidity | | Bad | Bad | Good |

Comparative Example 11

Paratone 8011, which is commercially available from Exxon Chemical Company, was obtained and after diluting it with n-hexane, the polymer solution was then poured into a large quantity of acetone to precipitate a polymer A. The obtained polymer A was collected and dried at 130° C. for 10 hours under reduced pressure to obtain an ethylene/propylene copolymer. The properties of the obtained polymer A are shown in Table 10. A lubricating oil composition was prepared in the same manner as in Example 1 except for using the obtained polymer as the lubricating oil viscosity modifier in the amount shown in Table 11. The performance of the resulting lubricating oil composition was evaluated. The results are shown in Table 11.

TABLE 10

| | | Polymer A |
|---|---|---|
| Ethylene content | mol % | 69.2 |
| Mw (relative to PS) × $10^4$ | g/mol | 22 |
| Mw/Mn | | 1.3 |
| Density (D) | g/cm$^3$ | 0.860 |
| Melting point (Tm, DSC) | °C. | 60.5 |
| 1073 × density − 893 | | — | 29.8 |
| Heat of fusion (ΔH, DSC) | J/g | 28.8 |
| $T_{half}$ | °C. | 108.6 |
| −0.71 × melting point + 101.4 | | — | 58.4 |

TABLE 11

| Polymer | | Comparative Example 11 Polymer A |
|---|---|---|
| Composition | | |
| Lubricating oil base stock | wt % | 87.5 |
| Detergent dispersant | wt % | 11 |
| Pour-point depressant | wt % | 0.5 |
| Polymer | wt % | 1.0 |
| Lubricating oil performance | | |
| Kinematic viscosity @ 100° C. | mm$^2$/s | 14.9 |
| CCS viscosity @ -25° C. | mPa · s | 6900 |
| MR viscosity @ -30° C. | mPa · s | 29800 |
| Low-temperature fluidity | | Bad |

Comparative Example 12

A lubricating oil composition was prepared in the same manner as in Example 1 except for using the copolymer obtained in Polymerization Example 13 as the lubricating oil viscosity modifier in the amount shown in Table 12. The performance of the resulting lubricating oil composition was evaluated. The results are shown in Table 12.

TABLE 12

| Polymer | | Comparative Example 12 Polymerization Example 13 |
|---|---|---|
| Composition | | |
| Lubricating oil base stock | wt % | 87.68 |
| Detergent dispersant | wt % | 11.0 |
| Pour-point depressant | wt % | 0.5 |
| Polymer | wt % | 0.82 |
| Lubricating oil performance | | |
| Kinematic viscosity @ 100° C. | mm$^2$/s | 14.88 |
| CCS viscosity @ -25° C. | mPa · s | 6990 |
| MR viscosity @ -30° C. | mPa · s | 24300 |
| Low-temperature fluidity | | x |

As is clear from Tables 5 to 12, the composition using a specific ethylene/α-olefin copolymer as the lubricating oil viscosity modifier exhibited excellent low-temperature properties such as CCS viscosity, MR viscosity, and low-temperature fluidity.

It has been desired that the low-temperature properties, e.g. CCS viscosity, MR viscosity, and low-temperature fluidity, of a lubricating oil composition be improved as much as possible. For example, the measured values of the CCS viscosity and the MR viscosity can be respectively reduced by about 10 and about 100 (i.e., the low-temperature properties can be improved) by increasing the degree of purification of the lubricating oil base stock. However, this results in an increase in cost.

On the other hand, according to the present invention, low-temperature properties can be improved without using such an expensive method and it has a great significance.

What is claimed is:

1. A lubricating oil composition comprising a copolymer containing a constituent unit derived from ethylene, and a constituent unit derived from an α-olefin having 3 to 20 carbon atoms, wherein the copolymer improves low-temperature properties of the lubricating oil composition and the copolymer has the following (1) to (6):

(1) the copolymer has a melting point (Tm) measured by DSC of -20° C. to 100° C.;
   (2) the copolymer has a molecular weight distribution (Mw/Mn) measured by GPC of 1.6 to 5.0;
   (3) the copolymer has a half-width (ΔThalf) of a melting peak measured by DSC of 90° C. or less;
   (4) the half-width (ΔThalf) and the melting point (Tm) satisfy the relationship shown by the expression:

ΔThalf≦-0.71×Tm+101.4

(5) the copolymer has a heat of melting (ΔH) measured by DSC of 100 J/g or less; and
   (6) the heat of melting (ΔH), a crystallization temperature Tc measured by DSC, and a crystallization temperature Tcrystaf measured by a CRYSTAF method satisfy the relationship shown by the expression:

Tc-Tcrystaf≧0.028×ΔH+25.3 wherein the amount of the copolymer is 0.1 to 30 percent by weight based on the lubricant oil composition.

2. The lubricating oil composition according to claim 1, further comprising a pour-point depressant.

3. The lubricating oil composition according to claim 1, wherein the α-olefin is propylene.

4. The lubricating oil composition according to claim 1, wherein the copolymer has a weight average molecular weight relative to polystyrene standards measured by GPC of 10,000 to 2,000,000.

5. A method of improving low-temperature properties of a lubricating oil composition by adding a copolymer to a lubricant oil base stock, wherein the copolymer containing a constituent unit derived from ethylene, and a constituent unit derived from an α-olefin having 3 to 20 carbon atoms, the copolymer having the following (1) to (6):

(1) the copolymer has a melting point (Tm) measured by DSC of -20° C. to 100° C.;
   (2) the copolymer has a molecular weight distribution (Mw/Mn) measured by GPC of 1.6 to 5.0;
   (3) the copolymer has a half-width (ΔThalf) of a melting peak measured by DSC of 90° C. or less;
   (4) the half-width (ΔThalf) and the melting point (Tm) satisfy the relationship shown by the expression:

ΔThalf≦-0.71×Tm+101.4

(5) the copolymer has a heat of melting (OH) measured by DSC of 100 J/g or less; and
   (6) the heat of melting (ΔH), the crystallization temperature Tc measured by DSC, and the crystallization temperature Tcrystaf measured by a CRYSTAF method satisfy the relationship shown by the expression:

Tc-Tcrystaf≧0.028×ΔH+25.3 wherein the amount of the copolymer is 0.1 to 30 percent by weight based on the lubricant oil composition.

6. The method of controlling low-temperature properties of a lubricating oil composition according to claim 5, wherein the α-olefin is propylene.

7. The method of controlling low-temperature properties of a lubricating oil composition according to claim 5, wherein the copolymer has a weight average molecular weight relative to polystyrene standards measured by GPC of 10,000 to 2,000,000.

* * * * *